Dec. 20, 1960
J. S. AIRA ET AL
2,964,930
CLUTCH CUSHION DEVICE
Filed Oct. 28, 1957
2 Sheets-Sheet 1
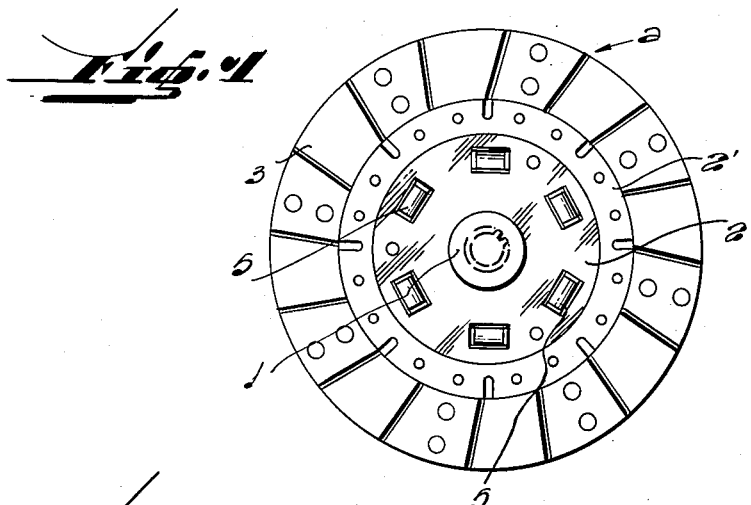
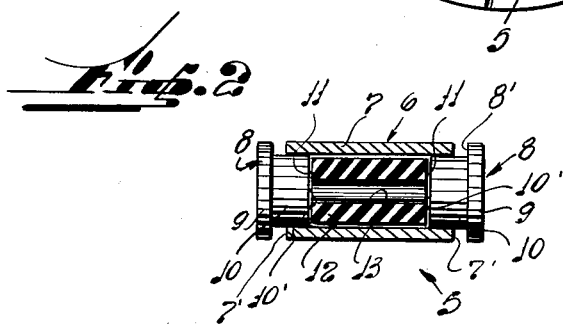
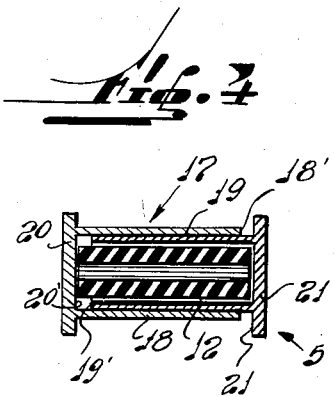
INVENTORS
Julio Severo Aira
Alejandro Edwards Reed
BY
Ivan P Tashof
Attorney

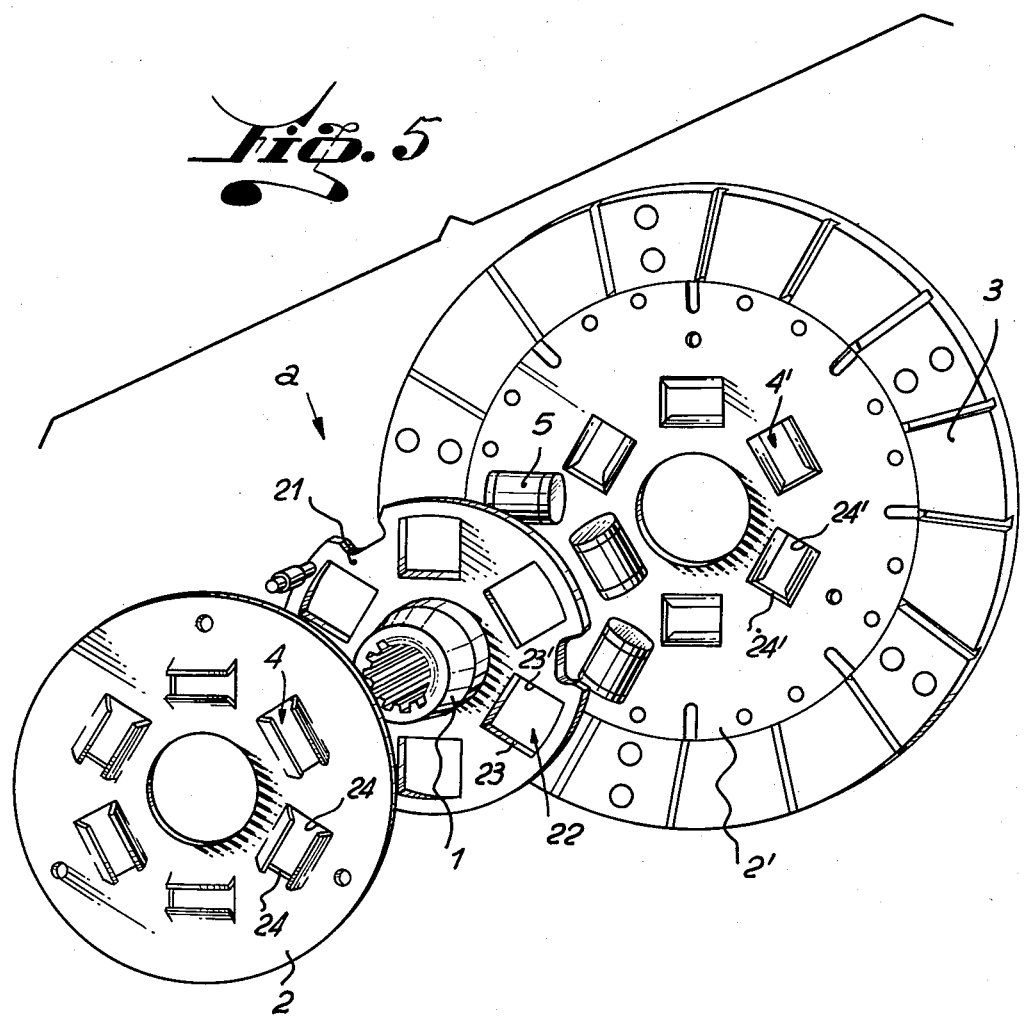

United States Patent Office 2,964,930
Patented Dec. 20, 1960

2,964,930

CLUTCH CUSHION DEVICE

Julio S. Aira, 5746 San Pedro St., and Alejandro E. Reed, both of Buenos Aires, Argentina; said Reed assignor to said Aira Filed Oct. 28, 1957, Ser. No. 692,749

8 Claims. (Cl. 64—27)

This invention relates to a clutch cushion device engageable between relatively movable clutch parts, to operate under compression and more particularly it refers to improvements in friction clutches of the single plate dry disk type used in motor cars and the like, and is a continuation-in-part of our previous application Serial No. 643,651, filed March 4, 1957, relating to "friction clutches," and now abandoned.

The clutch cushion device of the present invention is used in friction clutches for absorbing and compensating certain torque effects which arise the moment the clutch connects the rotating driving portion with the driven portion, as is well known to those skilled in the art.

The orthodox friction clutches use, instead of the above referred to clutch cushion device, a plurality of spaced apart helical compression spring mounted in the clutch plates about the hub. It is known that these springs are subject to very hard work and consequently they break after a rather short time of life, whereby the smooth operation of the clutch is not any more achieved.

Several attempts have been made to replace these springs by rubber blocks which have so far not achieved acceptance, due to several drawbacks, amongst which the most important are that those rubber blocks were merely housed within the clutch plates to replace the springs and therefore open to attack of oil and solvents, which reduced the life of those blocks in an inadmissible amount. In addition in these arrangements the rubber blocks were solid blocks and therefore upon being compressed expanded in different shapes which produced an unequilibrium in the clutch plate which is rather important, particularly when the clutch plate rotated at a high member of revolutions. Further attempts have been made to overcome this rather serious inconvenience by housing the solid rubber blocks in open housings formed of V-shaped leaf springs, wherein the rubber block in incompressed position does not reach the apex of the V and which should be reached more or less upon compression.

This required a unilateral expansion of each rubber block which does not tend to behave in such a way, since the rubber block is compressed on two opposite sides and therefore tends to expand in both directions, perpendicularly to the compressional forces. In other words, part of the blocks are side ways projecting out of the clutch plate with the corresponding wear and tear upon frictionally engaging other parts, whilst the expansion in the other (radial) direction tends only partially to protrude towards the apex. However since the apex portion is hollow, there is a larger tendency of the block to expand in that direction against "its better will" and therefore it will already be understood that this arrangement produces a considerable wear and tear on the internal structure of the blocks, reducing their life and therefore also this last suggestion has not been able to replace the common helical springs. In addition the above arrangement requires a special construction of the torsional shockabsorber.

The present invention on the other hand may be applied to any type of clutch plate which nowadays uses the helical compression springs.

In short, the present invention relates to a clutch cushion device engageable between relatively movable clutch parts to operate under compression, including a telescopical rigid housing having two opposite end plates and a compressible rubber-like elongated cushioning core housed in said housing and thereby insulated from outside, said core having two opposite end faces in contact with said end plates and said core having at least in-between its end faces a zone capable of increasing its cross-sectional surface to absorb compressional effects without resulting in a longer outer perimeter than the perimeter of said end faces.

It is therefore an object of the present invention to provide a clutch cushion device for clutch plates which may replace the conventional helical spring arrangements without requiring to modify the clutch plate itself.

Another object is to provide a clutch cushion device which has a rubber-like core insulated from outside so that no foreign matter, such as oil and solvents may attack said core.

Still another object is to provide a clutch cushion device, wherein the expansion of the rubber-like core, upon being compressed, is so guided that in first instance the core will not be able to block the telescopic fitting of its housing and in second instance it will not be able to expand in a non uniform may which might produce an unequilibrium of a plurality of these devices arranged in a circle-like manner in a clutch plate.

A further object is to provide a rubber-like core for a clutch cushion device, having a weakened portion, where the core may easily transversally expand upon being length-wise compressed.

These and further objects and advantages of the present invention will become more apparent during the course of the following description, wherein reference will be made by way of example to the embodiment shown in the accompanying drawings.

In the drawings:

Fig. 1 is a front view of a single plate dry disk friction clutch, wherein six clutch cushion devices, according to the present invention are housed, but only shown in a schematical way.

Figure 2 is a longitudinal section of a first embodiment of the clutch cushion device.

Figure 3 is a longitudinal section of another embodiment of a compressible rubber-like elongated cushioning core which may be used instead of the one shown for instance in Figure 2.

Figure 4 is a longitudinal section similar to Figure 2 of still another embodiment as a clutch cushion device, in accordance with the present invention.

Fig. 5 is an exploded view of the clutch structure shown in Fig. 1.

As may be seen in Figs. 1 and 5, the single plate dry disk friction clutch *a* comprises a hub 1 intergal with a central plate 21 having windows 22 including side portions 23, 23′, and clutch plates 2 and 2′ and a clutch friction ring 3, as is well known to those skilled in the art and therefore no further explanations will be given.

It is furthermore well known that the clutch plates 2 and 2′ provide a plurality of housings 4,4′, in the example shown six housings 4, 4′, in which the torque effect absorbing system, that is to say the clutch cushion devices of the present invention 5 are housed.

Turning now to Figure 2, wherein a first embodiment of the clutch cushion devices is shown, it may be seen that the latter consists of a telescopical rigid housing 6 formed of a metallic cylindrical tube 7 open at both ends and a pair of oppositely arranged metal blocks 8, each having a head portion 9 of larger diameter that the inner diameter of the metal tube 6 and a cylindrical body portion 10 of slightly smaller diameter than the inner diameter of the metal tube 6. Said cylindrical body portions 10 are partially telescopically fitted in the metal tube 6, so that the end plates 10' of the respective body portion 10 are entering the contact with the end faces 11 of a compressible rubber-like elongated cushioning core 12, in this embodiment of cylindrical shape.

Core 12 is provided with a longitudinal bore 13, coaxial with its longitudinal axis (not shown).

It will be understood that upon compressing metal blocks 8 one towards the other, that the core 12 will tend to transversally expand which may be easily performed in view of the bore 13, so that the perimeter of core 12 remains constant and does not tend to block the movement of the blocks 8 in a larger magnitude than the resistance opposed by the material of which core 12 is made.

It may be added that in case core 12 becomes inoperative or injured, the maximum compression is given by the moment shoulder 8' enters in contact with base 7' of tube 7. In addition, since core 12 is housed within housing 6, even if injured, such as disintegrated, it cannot leave the housing unless the latter is dismounted from the clutch plate a.

By comparing Figs. 1 and 5 it will be appreciated that the cushion devices 5 and more particularly the outer face of the head portions 9 (see Fig. 2) are in contact with the side portions 23, 23' of the central plate 21 (see Fig. 5) as well as with the side portions 24, 24' of the clutch plates 2, 2' respectively so that when the central plate 21 turns relative to the clutch plates 2, 2' a compression, that is to say, a torque effect, as is well known for those skilled in the art, will be exerted on the cushion devices 5.

Obviously instead of providing the compression absorbing zone by means of bore 13, a solid core 14 as shown in Figure 3, could be provided in which event the same effect will be achieved due to the fact that the central portion 15 of said core 14 is of smaller cross sectional surface than the end faces 16. Upon exerting a compressional effect on the end faces 16, the zone of less resistance, which is the central portion 15, will expand and said central portion 15 is so shaped that the maximum transversal expansion, will expand that central portion 15 to a cross sectional surface equal to the end faces 16.

The maximum compression is always under normal operation such, that shoulders 8' (see Fig. 2) will not enter in contact with bases 7'.

It has to be added that the cross section of the core 12 or its similar embodiments such as core 14 need not to be circular, in which event also tube 7 will not be cylindrical.

In Figure 4, the same type of core 12 as in Figure 2 has been shown, but the housing 17 is a different structure consisting of a pair of telescopically fitted tubes 18 and 19 having respective opposite base portions 20 and 21, so that core 12 is protected against any foreign particles which could harm the rubber or the like material. The free ends 18' and 19' of the respective tubes 18 and 19 are spaced apart in a small distance from the inner faces 20' and 21' of the base portions or end plates 20 and 21, respectively, so that thereby likewise a maximum compression of the core 12 is established.

Usually cores 12 or 14 are made of rubber but any other suitable compressible material may be used; similarly housings 6 and 17 are usually made of metal, but could be replaced by any other suitable rigid material.

Cores could also be provided having the combination of the features of cores 12 and 14, either partially or totally.

It is obvious that the embodiment of Fig. 4 or the solid core 14 of Fig. 3, housed in either devices of Figs. 2 or 4 are arranged in the clutch structure as shown in Fig. 5 in the identical way as described in connection with the embodiment of Fig. 2.

As may be appreciated in Figs. 2 and 4 it is convenient that there is a slight gap between the inner wall of housing 7 or 17 and the periphery of core 12, to assure correct operation.

We claim:
1. A clutch cushion device engageable between relatively movable clutch parts to operate under compression, including a telescopical rigid housing having two opposite end plates and a compressible rubber-like elongated cushioning core completely enclosed in said housing and thereby insulated from outside, said core having two opposite end faces in contact with said end plates and said core having at least in-between its end faces a zone capable of increasing its cross-sectional surface to absorb compressional effects without resulting in a longer outer perimeter than the perimeter of said end faces.

2. A clutch cushion device engageable between relatively movable clutch parts to operate under compression including a telescopic metal housing having two opposite end plates and a compressible rubber elongated cushioning core completely enclosed in said housing and thereby insulated from outside, said core having two opposite end faces in contact with said end plates having at least between its end faces a weakened zone capable of increasing its cross sectional surface to absorb compressional effects without resulting in a longer outer perimeter than the perimeter of said end face.

3. A clutch cushion device as claimed in claim 1, wherein said core has a longitudinal bore.

4. A clutch cushion device as claimed in claim 1, wherein said core has a longitudinal bore, coaxial with its longitudinal axis.

5. A clutch cushion device as claimed in claim 1, wherein said core is a solid core having a central portion of smaller cross sectional surface than said end faces.

6. A cushion device as claimed in claim 1, wherein said housing consists of a pair of telescopically fitted tubes having respective opposite base portions defining said end plates in contact with said end faces, said tubes having each a free end portion spaced apart from the base portion of the other tube and capable of entering in contact therewith.

7. A clutch cushion device as claimed in claim 1, wherein said housing consists of a tube open at both ends, said end plates consisting of a pair of plugs each comprising a head portion of larger cross section than the inner cross section of said tube and a body portion of slightly smaller cross section than the inner cross section of said tube, said body portions being partially slidably mounted in said open ends of said tube and adapted to enter in contact with said end faces of said core.

8. A clutch cushion device engageable between relatively movable clutch parts to operate under compression including a telescopic metal housing having two opposite end plates and a compressible rubber elongated cushioning core completely enclosed in said housing and thereby insulated from outside, said core having two opposite end faces in contact with said end plates and having at least between its end faces a zone having a cross-sectional area less than the area of said end faces, said zone being capable of increasing its cross-sectional area to absorb compressional effects without obtaining a greater outer perimeter than the perimeter of said end faces.

References Cited in the file of this patent
UNITED STATES PATENTS

| | | |
|---|---|---|
| 1,817,517 | Krotee | Aug. 4, 1931 |
| 2,221,823 | Thelander | Nov. 19, 1940 |
| 2,397,642 | Blazek et al. | Apr. 2, 1946 |
| 2,513,379 | Thelander | July 4, 1950 |
| 2,533,789 | Goodchild | Dec. 12, 1950 |
| 2,566,985 | Gee | Sept. 4, 1951 |
| 2,674,863 | Thelander | Apr. 13, 1954 |
| 2,833,131 | Miller | May 6, 1958 |

FOREIGN PATENTS

| | | |
|---|---|---|
| 726,386 | France | Feb. 29, 1932 |
| 162,139 | Australia | Mar. 23, 1955 |